(12) United States Patent
Hatano

(10) Patent No.: US 6,855,449 B2
(45) Date of Patent: Feb. 15, 2005

(54) FUEL CELL SYSTEM PROVIDED WITH FLUORIDE ABSORBER

(75) Inventor: Makoto Hatano, Obu (JP)

(73) Assignee: Aisan Kogyo Kabushiki Kaisha, Aichi-Ken (JP)

(*) Notice: Subject to any disclaimer, the term of this patent is extended or adjusted under 35 U.S.C. 154(b) by 72 days.

(21) Appl. No.: 10/423,941

(22) Filed: Apr. 28, 2003

(65) Prior Publication Data

US 2003/0232232 A1 Dec. 18, 2003

(30) Foreign Application Priority Data

Jun. 12, 2002 (JP) .......................................... 2002-171582

(51) Int. Cl.$^7$ .............................. H01M 8/04; C02F 1/42
(52) U.S. Cl. ......................... 429/34; 429/12; 210/683
(58) Field of Search ..................... 429/34, 12; 210/683

(56) References Cited

U.S. PATENT DOCUMENTS

| 2,553,595 A | * 5/1951 | Maier ........................ 423/158 |
| 5,679,257 A | * 10/1997 | Coate et al. ................ 210/695 |
| 2004/0195088 A1 | * 10/2004 | Rostaing et al. ............ 204/164 |

* cited by examiner

*Primary Examiner*—John S. Maples
(74) *Attorney, Agent, or Firm*—Dennison, Schultz, Dougherty & MacDonald (57) ABSTRACT

Removing fluorine elements from circulating water that cools a fuel cell power generation system increases the durability of metal piping etc. of a water circulation path of this system.

The fuel cell power generation system is provided with: a fuel cell main body 4, a water circulation path 8, and a fluoride absorber 6 provided in at least a portion of the water circulation path 8. The fluoride absorber 6 absorbs fluorine elements from water flowing through the water circulation path 8.

8 Claims, 6 Drawing Sheets

$$-(CF_2CF_2)_x-(CF_2CF)_y-$$
$$|$$
$$(OCF_2CF)_mO(CF_2)_nSO_3H$$
$$|$$
$$CF_3$$

( $m \geqq 1$, $n=2$, $x=5\sim13.5$, $y=1000$ )

FUEL CELL SYSTEM PROVIDED WITH FLUORIDE ABSORBER

CROSS-REFERENCE

This application claims priority to Japanese patent application serial number 2002-171582, the contents of which are hereby incorporated by reference as if fully set forth herein.

BACKGROUND OF THE INVENTION

1. Filed of the Invention

The present invention relates to a power generation system utilizing a fuel cell (hereafter referred to as fuel cell system). Specifically, it relates to a technique for removing fluorine from water circulating through a water circulation path of the fuel cell system.

2. Description of the Related Art

In fuel cell systems, hydrogen obtained by reforming fuel such as methanol, gasoline, etc. is supplied to a negative electrode (fuel electrode) of the fuel cell, and air is supplied to a positive electrode (air electrode). An electrochemical reaction between the hydrogen and oxygen is caused to take place within the fuel cell, thus generating power. Among fuel cell systems, it is expected that so-called polymer electrolyte-type fuel cells (PEFC), which use a polymer electrolyte membrane that conducts hydrogen ions, will readily constitute a compact and highly efficient power generating system. PEFC is expected to be an appropriate power source for electric cars, etc.

Polymer electrolyte-type fuel cells usually utilize a perfluoro-type fluorocarbon polymer ion exchanging membrane (for example, a membrane formed from perfluorocarbon sulfonic acid having the sulfonic acid group as the ion exchanging radical). It is essential that this type of membrane remains wet for maintaining sufficient conductivity of hydrogen ions.

Furthermore, since fuel cells use an exothermic reaction between hydrogen and oxygen, heat tends to be produced. However, the optimal operating temperature of polymer electrolyte-type fuel cells is 80° to 100° C. Consequently, cooling must be performed. Usually, cooling water is introduced through the fuel cells.

Moreover, the reaction between hydrogen and oxygen forms water at the positive electrodes (air electrode) of the fuel cells. The water that is formed within the fuel cells must be removed from the fuel cells.

In power generating systems mainly composed of polymer electrolyte-type fuel cells, the polymer electrolyte membranes must remain wet, the fuel cells must be cooled, and water formed at the positive electrodes must be discharged. In order for these functions to be performed, a water circulation path passes through a fuel cell main body (stack).

Since fuel cell systems have become more compact in recent years, water circulation paths that are as simple as possible have been devised. For example, Japanese laid open patent publication 6-275284 presents a polymer electrolyte-type fuel cell wherein a portion of the cooling water flowing a cooling water passage formed within a gas separator is supplied to a negative electrode (fuel electrode), and water formed at a positive electrode (air electrode) is guided into the cooling water passage.

In this type of power generating systems utilizing fuel cells, providing a water circulation path along which the cooling water circulates allows all of the followings to be realized: the cooling water circulates; the polymer electrolyte membrane remains wet; and the water that has been formed is discharged.

SUMMARY OF THE INVENTION

A piping system for a water circulation path is indeed simplified if a portion of the cooling water is supplied to the negative electrode (fuel electrode) so that the polymer electrolyte membrane remains wet, and the water formed at the positive electrode (air electrode) of the fuel cell flows into the cooling water and circulates. However, research by the present inventor shows that the following problem occurs.

As stated above, polymer electrolyte-type fuel cells use a fluorocarbon polymer ion exchanging membrane as the polymer electrolyte membrane, wherein typically the principal chain of the polymer consists of fluorocarbon polymer and side chains of the polymer consist of the sulfonic acid group capable of adding hydrogen ions (protons) thereto. When this type of membrane is used in a state whereby water is added (a wet state), a very small amount of fluorine ions separates from the principal chain and reacts with surrounding water molecules to form hydrogen fluoride. When the water, either from the cooling water supplied to the fuel electrodes or the water formed at the air electrodes, circulates for a long period, fluorine elements such as fluorine ions, hydrogen fluoride, etc., gradually accumulate in the cooling water.

The fluorine elements in the circulating water lower the pH value of the circulating water (cooling water), rendering it more corrosive to metal. Furthermore, the fuel cells can get damaged. Consequently, in order to improve the reliability and service life of the water circulating-type fuel cell systems, fluorine elements must not be allowed to accumulate in the circulating water.

The present invention was created in light of the discovery that preventing the accumulation of fluorine elements in the circulating water plays an important role in improving the reliability and service life of the water circulating-type fuel cell systems. The object of the present invention is to prevent the fuel cells, metal components of the fuel cell systems (for example, the piping that comprises the water circulation path), etc., from being damaged by fluorine elements such as hydrogen fluoride, etc., contained in the circulating water.

The fuel cell system of the present invention is provided with a fuel cell main body and a circulation path that causes water passing through the fuel cell main body to circulate (here and below, the water may also be in the form of water vapor). The fuel cell system of the present invention is characterized in having a fluoride absorber embedded in the water circulation path, this fluoride absorber absorbing fluorine elements from the water circulating through this water circulation path.

If the fluoride absorber is embedded in the water circulation path, fluorine elements can be removed from the circulating water, thus preventing damage to the metal components of the fuel cell system (for example, the piping comprising the water circulation path) and to the fuel cell, etc.

It is particularly preferred that the fluoride absorber is a cartridge type attached to the water circulation path in a manner that the fluoride absorber can be readily replaced. Making the fluoride absorber a cartridge type allows the easy replacement of the fluoride absorber. In other words, by making the fluoride absorber a cartridge type, the fluoride absorbing member can easily be replaced when the fluoride absorbing capacity thereof has decreased. This increases the durability of the fuel cell system, and also improves maintenance.

The other aspect of the present invention is to present the cartridge-type fluoride absorber utilized in the fuel cell system.

The fluoride absorber is provided with a cartridge case and a fluoride absorbing member housed within the cartridge case. The cartridge case forms a portion of the water circulation path, the fluoride absorbing member making direct contact with the circulating water.

It is preferred that the fluoride absorbing member within the fluoride absorber of the present invention is principally formed from hydroxyapatite.

Hydroxyapatite (typically $Ca_{10}(PO_4)_6(OH)_2$) readily becomes fluoroapatite (typically $Ca_{10}(PO_4)_6(F)_2$) by reacting to fluorine elements in water. By adopting a fluoride absorbing member containing hydroxyapatite, the fluorine elements in the water can be removed rapidly and efficiently.

The fuel cell main body typically applicable to the present invention is a layered plurality of unit cells having a negative electrode (fuel electrode) supplied with hydrogen gas at one face of a polymer electrolyte membrane and a positive electrode (air electrode) supplied with air at the other face of the polymer electrolyte membrane. The polymer electrolyte membrane is a fluorocarbon polymer ion exchanging membrane.

The shape and type of constituent material of the fluoride absorber of the present invention is not restricted, as long as these remove fluorine elements (typically fluorine ions, hydrogen fluoride) from the water flowing through the water circulation path.

For example, the fluoride absorber may have a shape whereby the fluoride absorbing member is affixed to a portion of an inner wall face of the piping that comprises the water circulation path (here, this also includes the water tank etc. in which the circulating water is stored). A suitable arrangement is one where a cartridge-type fluoride absorber is attached to a portion of the water circulation path in a manner that it can be easily replaced.

Any fluoride absorbing member can be employed, as long as it has the property of absorbing or removing the fluorine elements such as fluorine ions, hydrogen fluoride, etc. from the water.

For example, the fluoride absorbing member may comprise a metal compound having a greater ionizing tendency than the metal comprising the piping of the water circulation path and the water tank, this metal compound typically comprising a calcium compound (typically in the form of powder or particles) such as calcium hydroxide, calcium chloride, etc. In the fluoride absorber containing this type of fluoride absorbing member, the fluorine ions in the water and the calcium react, the calcium fluoride that is precipitated is trapped by a means for separating solids and liquids, such as a fine film, an aluminum coagulating agent, etc., and the fluorine elements are thus removed from the water circulation path.

Alternatively, an ion exchanging member capable of adsorbing fluorine or a chelating member may equally well be utilized as the fluoride absorbing member. This type of fluoride absorbing member is preferably composed of a zirconium ferrite ion exchanging member or a fluorine chelating resin that bears cerium (Ce).

Furthermore, a ceramic member having comparatively greater temperature resistivity can suitably be utilized as the fluoride absorbing member. The material from which this type of ceramic member is preferably formed is a ceramic having a hydroxyl group that readily displaces $F^-$. Hydroxyapatite is particularly suitable as it has a high capacity for adsorbing fluorine and can easily be molded into differing shapes. From the viewpoint of maximizing the area thereof directly coming into contact with water, porous hydroxyapatite (typically having a needle-shaped crystal configuration) is particularly suitable.

The fluoride absorbing member may be formed in its entirety from a fluorine adsorbing material, or the fluoride absorbing member may be provided with the fluorine adsorbing material only in the portion thereof that makes contact with the water in the water circulation path. For example, the fluoride absorbing member may equally well be a fluorine absorbing material (for example, chelating resin or hydroxyapatite) coated onto a surface face of a supporting body that has high mechanical strength.

Since the ceramic member formed from hydroxyapatite etc. has good mechanical strength and molding processability, it can be formed into a variety of differently-shaped fluoride absorbing members. A suitable alternative is that a supporting member (or a supporting layer) is formed from a different ceramic, such as silica or the like, and a fluorine adsorbing ceramic member formed from hydroxyapatite etc., is coated onto a surface face thereof. For example, the present invention proposes a double-layered fluoride absorbing member that has a hydroxyapatite layer formed on an upper face of a quartz glass layer (supporting layer). The double-layered fluoride absorbing member may be formed on inner walls of the piping (typically formed from stainless steel) that comprises the water circulation path.

The present invention can be better understood with reference to the drawings and by reading the embodiments.

PREFERRED EMBODIMENTS

Figure 1:
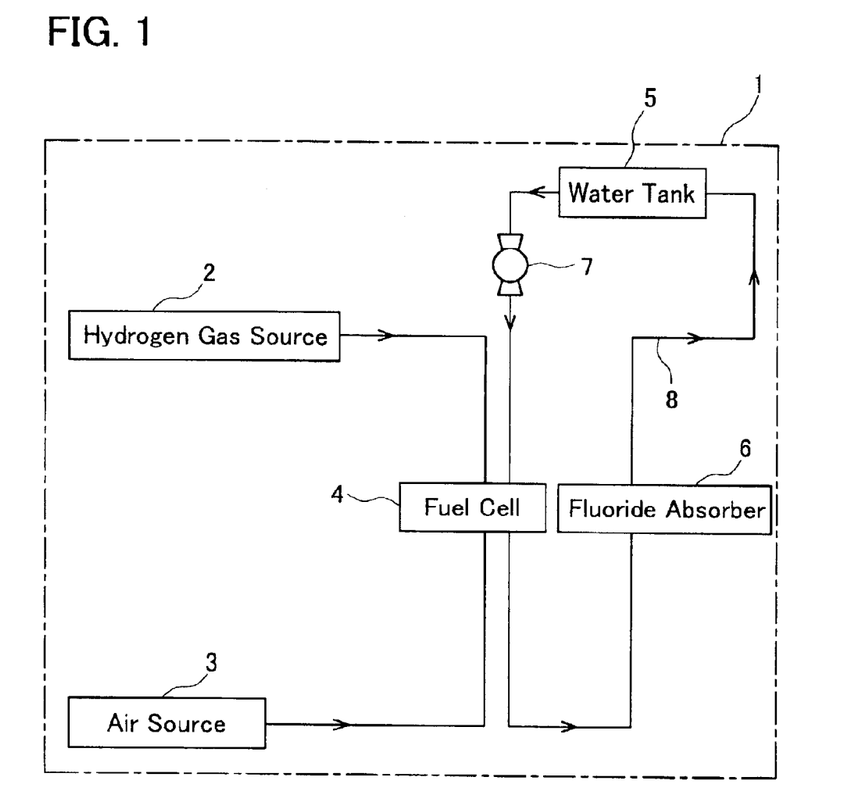
FIG. 1 shows a schematic view of a fuel cell system of the present invention.
Figure 2:
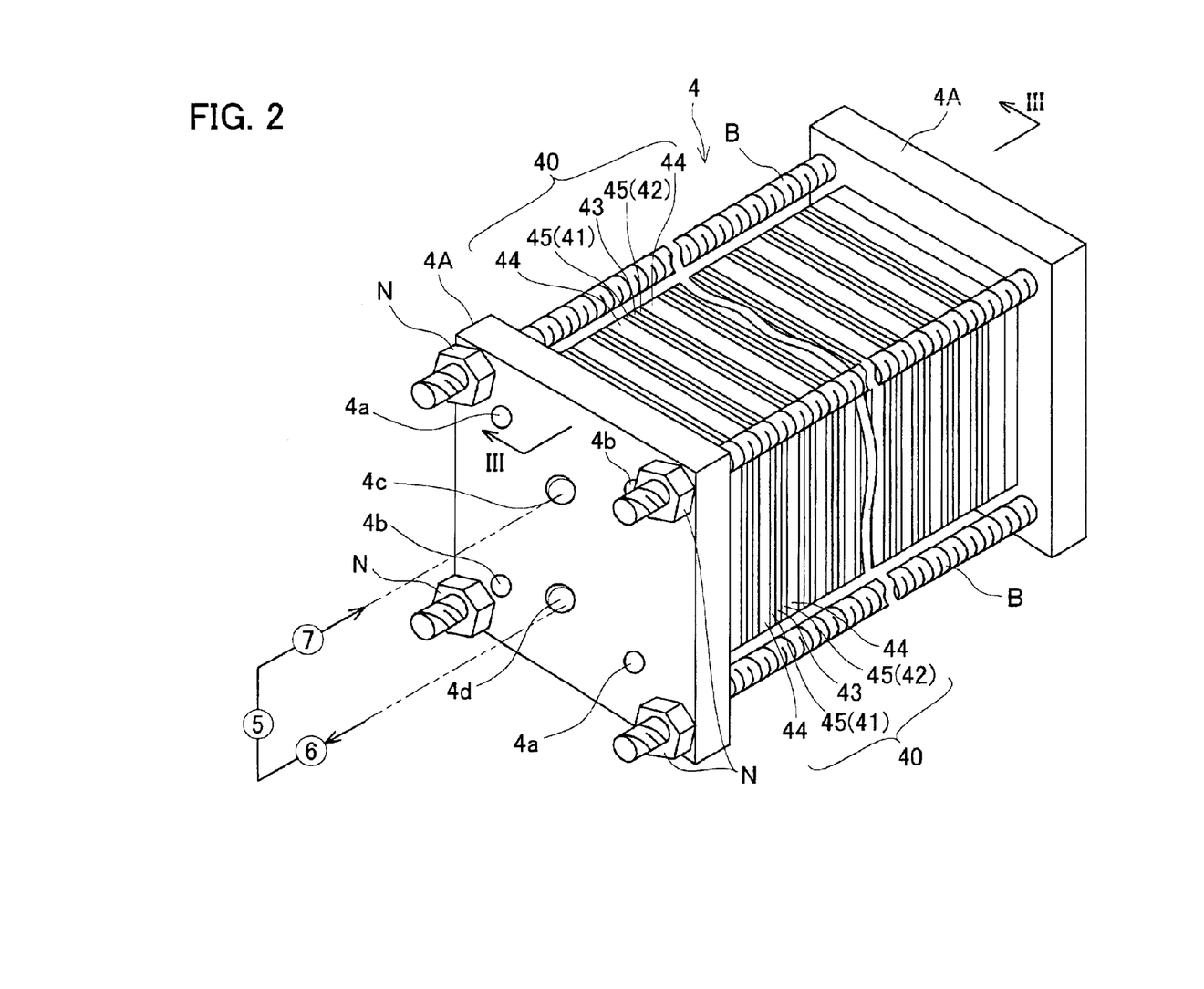
FIG. 2 shows an overall diagonal view of a fuel cell main body (stack).
Figure 3:
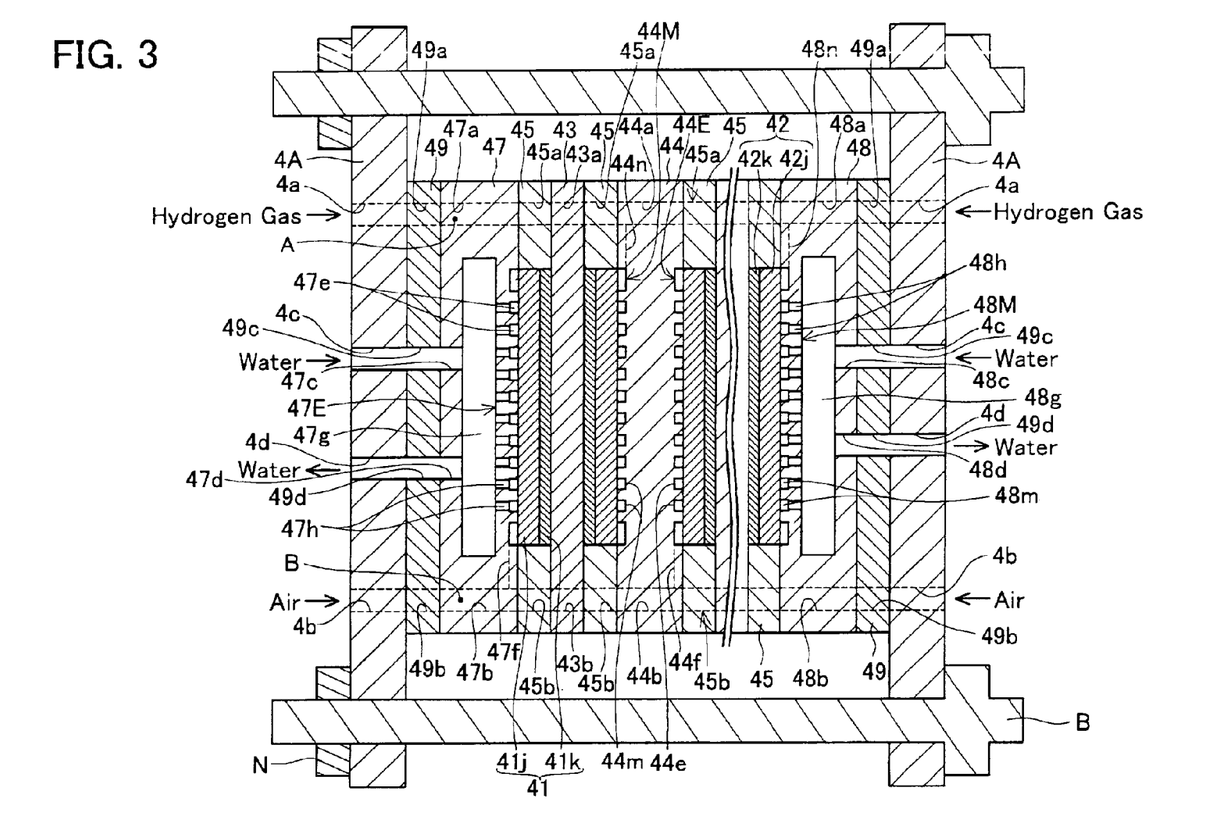
FIG. 3 shows a cross-sectional view along the line III—III of FIG. 2.
Figure 4:
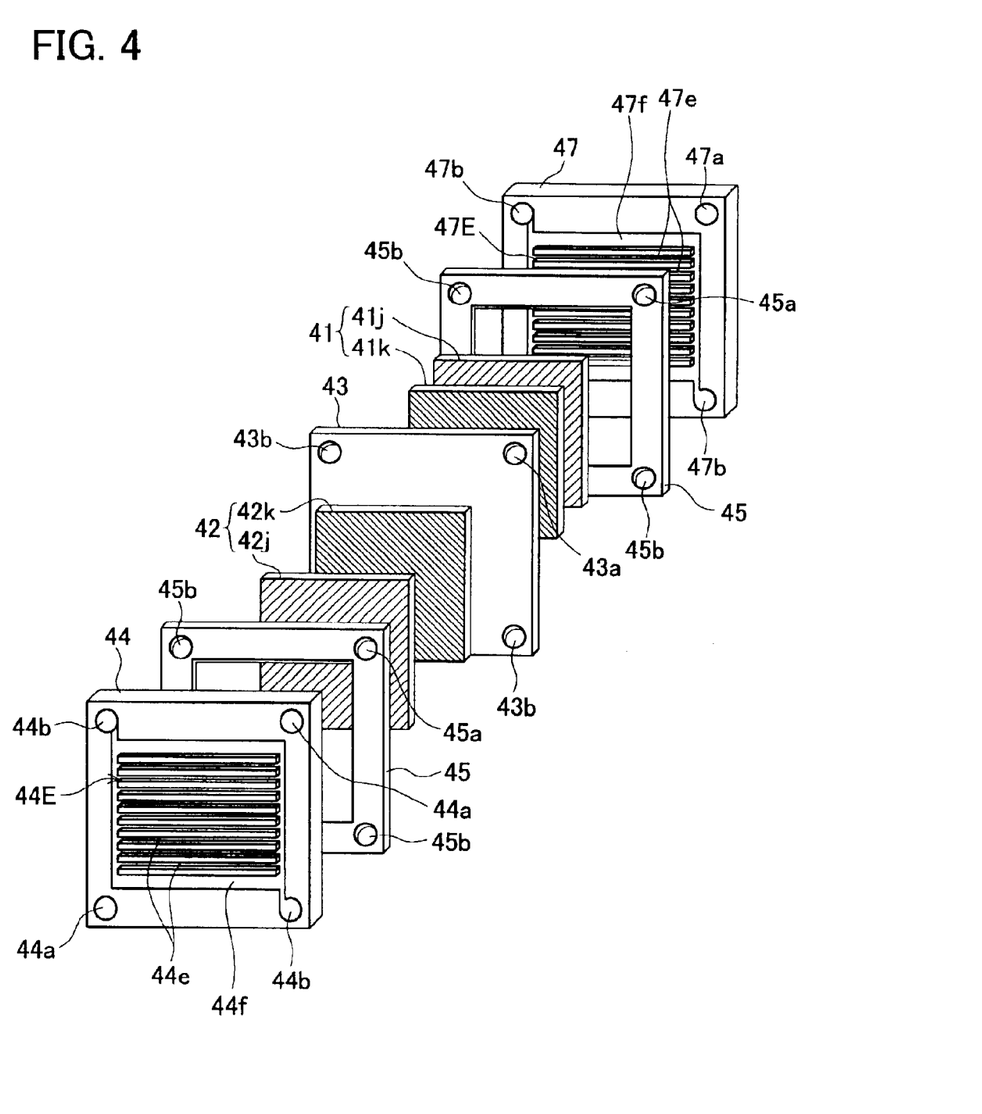
FIG. 4 shows a disassembled diagonal view of a portion of the fuel cell main body (stack) of FIG. 2.
Figure 5:
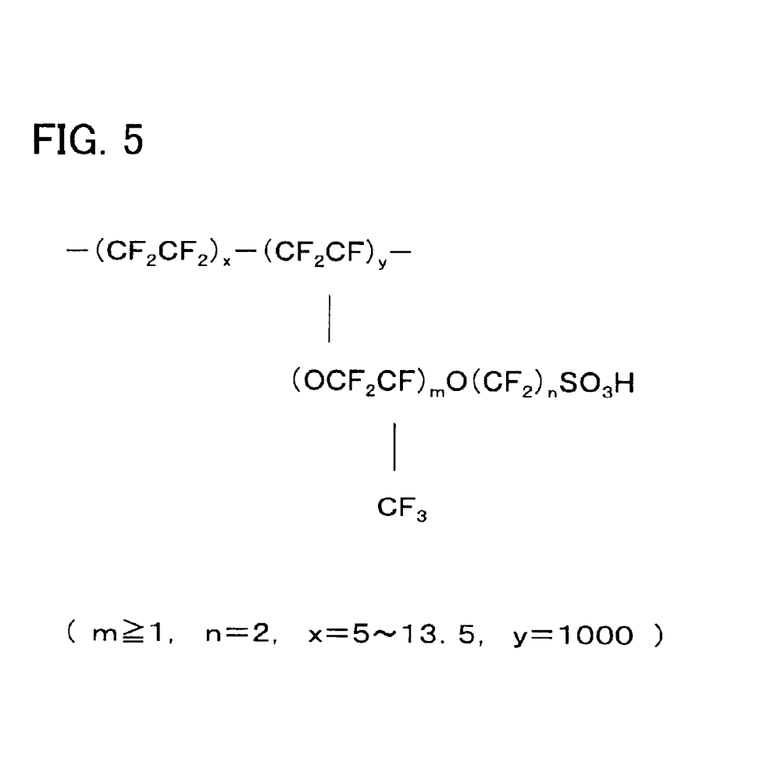
FIG. 5 shows an example of the chemical structure of the material comprising a fluorocarbon polymer ion exchanging membrane.
Figure 6:
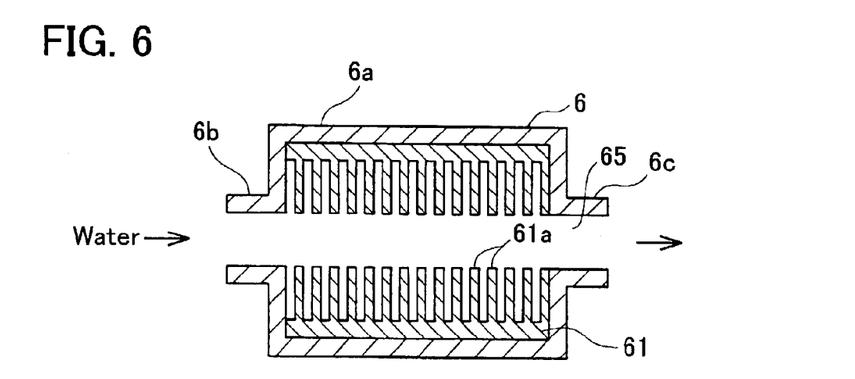
FIG. 6 is a view showing the interior structure of a cartridge-type fluoride absorber.

A first embodiment of the present invention will be described in detail below with the aid of FIGS. 1–6. FIG. 1 is a schematic view of a fuel cell system of the present invention, FIG. 2 is an overall diagonal view of a fuel cell main body comprising the fuel cell system, FIG. 3 is a cross-sectional view along the line III—III of FIG. 2, FIG. 4 is a disassembled diagonal view of a portion of the fuel cell main body, FIG. 6 is a cross-sectional view of a fluoride absorber. Furthermore, in the following description, the relative dimensions of each component are not necessarily accurate.

As shown in FIG. 1, a fuel cell system 1 is provided with a hydrogen gas source 2, an air source 3, a fuel cell main body 4 (hereafter referred to as fuel cell 4), a water tank 5, a pump 7, and a fluoride absorber 6.

The hydrogen gas source 2, which supplies hydrogen gas to be used as fuel to the fuel cell 4, consists of, for example, a hydrogen cylinder filled with liquefied hydrogen gas, a hydrogen occluded alloy in which hydrogen gas is occluded, or the like. Further, the hydrogen gas source 2 can also comprise a reformer that forms hydrogen gas by water-vapor reforming of hydrocarbon materials such as methanol etc.

The air source 3 supplies air to the fuel cell 4 and consists of, for example, an air compressor or the like.

The fuel cell 4 generates power exothermically. The power generating efficiency of the fuel cell 4 decreases as the temperature thereof rises. To deal with this, the circulation water stored in the water tank 5 is sent into the fuel cell 4 by means of the pump 7 so as to cool the fuel cell 4. Furthermore, since the fuel cell 4 generates power by means of a reaction between hydrogen and oxygen, water is formed as power is generated. Both the circulation water that has passed through the fuel cell 4 and the water that has been formed in the fuel cell 4 are returned to the water tank 5 through a water circulation path 8. In order to prevent damage to the fuel cell 4, the water that circulates through the water circulation path 8 must be pure water from which ions have been removed.

Trace quantities of fluorine compounds are present in the water that has passed through the fuel cell 4 and the water formed within the fuel cell 4. These fluorine compounds are removed from the circulating water by passing the water that is circulating in the water circulation path 8 through the fluoride absorber 6, thus maintaining the circulating water in a pure state.

As shown in FIG. 2, the fuel cell 4 consists of a pair of end plates 4A between which a plurality of unit cells 40 are fixed in a layered state. Bolts B and nuts N are utilized to fix the plurality of unit cells 40 in a layered state. In the case where the fuel cell 4 is used in an electric car, the fuel cell 4 is located within the engine room.

As shown in FIGS. 3 and 4, each unit cell 40 is formed from a positive electrode (air electrode) 41, a negative electrode (fuel electrode) 42, and an electrolyte member 43, all of these being sandwiched between a pair of central plates 44. However, the unit cell 40 on the left side in FIG. 3 is sandwiched between a left side plate 47 and one of the central plates 44, and the unit cell 40 on the right side is sandwiched between a right side plate 48 and one of the central plates 44. Adjoining unit cells 40 share one central plate 44 in common, these unit cells 40 essentially being separated by this central plate 44.

The positive electrode 41 consists of a collecting body 41*j* and a catalyst layer 41*k*. The negative electrode 42 consists of a collecting body 42*j* and a catalyst layer 42*k*. The collecting bodies 41*j* and 42*j* may be formed, for example, from a porous body member having conductor particles collected thereon. The catalyst layers 41*k* and 42*k* may be formed, for example, from a porous body matrix composed of carbon particles bearing a catalyst powder consisting of platinum, etc. As shown in FIG. 4, the positive electrode 41 and the negative electrode 42 each have a gasket 45 enclosing their circumference edges. Four corner portions of each gasket 45 have through holes 45*a* (as will be explained later, hydrogen gas is supplied via the through holes 45*a*) and through holes 45*b* (as will be explained later, air is supplied via the through holes 45*b*) formed therein.

The electrolyte member 43 exhibits proton conductivity and consists of an ion exchanging membrane that is selectively permeable to protons (hydrogen ions). Here, 'NAFION (Registered trademark)' manufactured by E. I. DuPont, America, was used. This membrane is the fluorocarbon polymer ion exchanging membrane shown in the example of chemical structure shown in FIG. 5. Through holes 43*a* and 43*b* are formed in the four corner portions of the electrolyte member 43, these corresponding to the through holes 45*a* and 45*b* of the gaskets 45.

The left side plate 47, the central plates 44, and the right side plate 48 are formed from a conductor such as stainless steel, titanium alloy, or the like. As shown in FIGS. 3 and 4, air supply grooves 44E and 47E are formed in one face of each of the plates 44 and 47 respectively (the faces on the right side in FIG. 3, the faces abutting the positive electrode 41), these air supply grooves 44E and 47E having a plurality of linear grooves 44*e* and 47*e* extending in a linear shape. As shown in FIG. 4, connecting concave members 44*f* and 47*f* are formed at the periphery of the linear grooves 44*e* and 47*e* of the air supply grooves 44E and 47E, these connecting concave members 44*f* and 47*f* communicating with the linear grooves 44*e* and 47*e*. The concave members 44*f* and 47*f* connect with through holes 44*b* and 47*b* (to be described).

Hydrogen gas supply grooves 44M and 48M are formed in the other face of the plates 44 and 48 respectively (the faces on the left side in FIG. 3, the faces abutting the negative electrode 42), these hydrogen gas supply grooves 44M and 48M having a plurality of linear grooves 44*m* and 48*m* extending in a linear shape. Although this is not shown in FIG. 4, connecting concave members 44*n* and 48*n* are formed at the periphery of the linear grooves 44*m* and 48*m* of the hydrogen gas supply grooves 44M and 48M, these connecting concave members 44*n* and 48*n* communicating with the linear grooves 44*m* and 48*m*. The concave members 44*n* and 48*n* connect with through holes 44*a* and 48*a* (to be described).

Through holes 47*a*, 47*b*, 44*a*, 44*b*, 48*a*, and 48*b* are formed in the four corner portions of the plates 47, 44, and 48 respectively, these through holes corresponding to the through holes 45*a* and 45*b* of the gaskets 45. The through holes 47*a*, 45*a*, 43*a*, 44*a*, and 48*a* are aligned in a linear manner to form a through path that communicates with the connecting concave members 44*n* and 48*n* that are used for supplying hydrogen gas. The through holes 47*b*, 45*b*, 43*b*, 44*b* and 48*b* are aligned in a linear manner to form a through path that communicates with the connecting concave members 44*f* and 47*f* that are used for supplying air.

The plate 47, located at the leftmost side in FIG. 3, has a hollow space 47*g* formed therein. The plate 48, located at the rightmost side, has a hollow space 48*g* formed therein. In the manner of the plate 44 described above, the right-side face of the left-side plate 47 has air supply grooves 47E formed therein, these consisting of the plurality of grooves 47*e* extending in a linear shape and the connecting concave members 47*f* formed at the periphery of these grooves 44*e*. Further, in the manner of the plate 44 described above, a left-side face of the plate 48 has the hydrogen gas supply grooves 48M formed therein, these consisting of the plurality of grooves 48*m* extending in a linear shape and the connecting concave members 48*n* formed at the periphery of these grooves 48*m*.

As shown in FIG. 3, through holes 47*h* that pass through to the space 47*g* are formed in the base of each groove 47*e* of the left-side plate 47. Moreover, through holes 48*h* passing through to the space 48*g* are formed in the base of each groove 48*m* of the right-side plate 48.

Further, a pair of holes 47*c* and 47*d* connecting to the space 47*g* are formed in a central portion of a left-side face (i.e. the face that does not have the air supply grooves 47E formed therein) of the left-side plate 47. Moreover, a pair of holes 48*c* and 48*d* connecting to the space 48*g* are formed in a central portion of a right-side face (i.e. the face that does not have the hydrogen supply grooves 48M formed therein) of the right-side plate 48. The through holes 47a and 47b, corresponding to the through holes 45a and 45b of the gaskets 45, are formed in the four corner portions of the left-side plate 47. The through holes 48a and 48b, corresponding to the through holes 45a and 45b of the gaskets 45, are formed in the four corner portions of the right-side plate 48. The through holes 47a and 48a communicate with the hydrogen gas supply grooves 44M and 48M. The through holes 47b and 48b communicate with the air supply grooves 44E and 47E.

As shown in FIGS. 2 and 3, both end plates 4A are larger in size than the plates 44, 47, and 48, each of the four corner portions of the end plates 4A being fastened by the bolts B and nuts N. An insulating member 49 is located between one of the end plates 4A and the plate 47. Through holes 49a and 49b, these corresponding to the through holes of all the members described above, are formed in the four corner portions of the insulating member 49. Another insulating member 49 is located between the other end plate 4A and the plate 48. Through holes 49a and 49b, these corresponding to the through holes of all the members described above, are formed in the four corner portions of this insulating member 49. A center portion of the left-side insulating member 49 has through holes 49c and 49d formed therein, these corresponding to the pair of through holes 47c and 47d. A center portion of the right-side insulating member 49 has through holes 49c and 49d formed therein, these corresponding to the pair of through holes 48c and 48d.

The left-side end plate 4A has 4a and 4b formed therein, these corresponding to the through holes formed in the four corner portions of all the members described above. The center portion of the left-side end plate 4A has 4c and 4d formed therein, these corresponding to the pair of through holes 49c and 49d. The right-side end plate 4A also has 4a and 4b formed therein, these corresponding to the through holes formed in the four corner portions of all the members described above. The center portion of the right-side end plate 4A also has 4c and 4d formed therein, these corresponding to the pair of through holes 49c and 49d.

When the fuel cell main body 4 shown in FIG. 2 is in an assembled state, the through holes formed in the four corner portions of all the members described above communicate to form gas passages A and B (see FIG. 3). The through holes 4a of the end plates 4A communicate with the gas passages A to supply hydrogen gas at the negative electrode 42 side of the electrolyte member 43 of the fuel cell 4. The through holes 4b of the end plates 4A communicate with the gas passages B to supply air at the positive electrode 41 side of the electrolyte member 43 of the fuel cell 4.

The through hole 4c of the left-side end plate 4A, the through hole 49c of the insulating member 49, and the through hole 47c of the plate 47 communicate to the space 47g, forming a through path along which water is supplied to the space 47g. The through hole 4d of the left-side end plate 4A, the through hole 49d of the insulating member 49, and the through hole 47d of the plate 47 communicate to the space 47g, forming a through path along which water is discharged from the space 47g. The through hole 4c of the right-side end plate 4A, the through hole 49c of the insulating member 49, and the through hole 48c of the plate 48 communicate to the space 48g, forming a through path along which water is supplied to the space 48g. The through hole 4d of the right-side end plate 4A, the through hole 49d of the insulating member 49, and the through hole 48d of the plate 48 communicate to the space 48g, forming a through path along which water is discharged from the space 48g.

In the fuel cell system 1 configured as described above, the hydrogen gas sent from the hydrogen gas source 2 is supplied to the gas passages A from the through holes 4a of the end plates 4A, the hydrogen gas being introduced into the hydrogen gas supply grooves 44M and 48M via the connecting concave members 44n and 48n, and being introduced to the negative electrode 42 side of the electrolyte member 43 of the fuel cell 4. The air sent from the air source 3 is supplied to the gas passages B from the through holes 4b of the end plates 4A, the air being introduced into the air supply grooves 44E and 47E via the connecting concave members 44f and 47f, and being introduced to the positive electrode 41 side of the electrolyte member 43 of the fuel cell 4.

Furthermore, the pure water sent from the pump 7 is introduced into the spaces 47g and 48g from the through holes 4c of the end plates 4A, thus cooling the fuel cell main body 4. The pure water that has cooled the fuel cell main body 4 is discharged from the spaces 47g and 48g via the through holes 4d of the end plates 4A, and is returned to the water tank 5.

A portion of the water that is supplied into the spaces 47g and 48g is introduced to the positive electrode 41 and the negative electrode 42 via the through holes 47h and 48h and the grooves 47e and 48m, and is further supplied to the ion exchanging membrane that comprises the electrolyte member 43. Further, a portion of the water supplied into the spaces 47g and 48g is transmitted to the ion exchanging membranes 43 of the other unit cells 40 via the gas passages A and B, wetting these ion exchanging membranes 43. In this manner, the ion exchanging membrane 43 of each unit cell 40 is vested with suitable proton (hydrogen ion) conductivity.

The hydrogen ions that have penetrated the ion exchanging membrane 43 and the oxygen contained in the air react at the positive electrode 41, forming water. The water that has been formed is introduced into the space 47g via the connecting concave member 44f, the gas passages B, the connecting concave member 47f, the grooves 47e, and the through holes 47h. That is, the water that has been formed at the positive electrode 41 (i.e. water containing trace quantities of fluorine elements) joins together with the pure water used for cooling and is discharged from the fuel cell main body 4.

The water that has been discharged in this manner is passed through the fluoride adsorber 6 integrated into the water circulation path 8. This passage through the fluoride adsorber 6 removes fluorine elements from the water that has passed through the fuel cell or the water formed within the fuel cell, maintaining the water to be circulated in the water circulation path 8 in a pure state. Corrosion resistant metal such as SUS etc. is utilized for the piping of the water circulation path 8.

The fluoride adsorber 6 is a cartridge type that comprises a portion of the piping of the water circulation path 8 and is capable of being removed. As shown in FIG. 6, the cartridge 6 is provided with a cartridge case 6a housing a fluoride absorbing member 61. The cartridge case 6a has an inflow connection hole 6b connecting with an upstream side of the water circulation path 8 of the fuel cell system, and an outflow connection hole 6c connecting with a downstream side of the water circulation path 8 of the fuel cell system. The cartridge case 6a forms a portion of the water circulation path 8 of the fuel cell system. A plurality of plates 61a are housed within a current through member (discharge channel) 65 within the cartridge 6, these plates 61a protruding from an inner wall face of the cartridge case 6a, being arranged coaxially with a central opening and being spaced at an equal distance from one another (here, they will be referred to as having a comb-shaped polyhedron shape). Each plate 61a has an identical shape and protrudes in a direction approximately orthogonal to the direction of the water current. Furthermore, in the present embodiment, the fluoride absorbing member 61 is formed from porous hydroxyapatite.

The fluorine elements in the circulating water are introduced into the discharge channel 65 of the fluoride adsorber cartridge 6, and are absorbed by the fluoride absorbing member (porous hydroxyapatite) 61. In the present embodiment, the plurality of plates 61a described above increase the surface that comes into contact with the water. Consequently, even though the cartridge 6 is compact, it can remove the fluorine elements efficiently.

Moreover, as shown in FIG. 6, the portion of the cartridge 6 (specifically, the discharge channel) having the fluoride absorbing member 61 formed therein is wider in diameter than the portions to the anterior and posterior thereof. Consequently, even though the cartridge 6 is compact, sufficient space is ensured for providing the fluoride absorbing member 61, and water can flow freely through the discharge channel.

Further, in the present embodiment, the plates 61a of the fluoride absorbing member 61 have the same shape and size and are aligned along the direction in which the water flows. However, the plates 61a are not necessarily restricted to this shape. For example, various types of plates may be aligned that have differing heights and/or widths. It is possible to increase the efficiency of fluoride absorption by using a fluoride absorbing member that has a mixture of plates of differing heights and widths, this increasing the area and time of contact with the water flowing through the discharge channel 65.

One embodiment of the present invention has been described above. However, the fuel cell system and fluoride absorber of the present invention are not restricted to the form described in the present embodiment.

In the embodiment described above, the fluoride absorbing member is formed in a comb-shaped polyhedron shape (as shown). However, the fluoride absorbing member is not restricted to this shape.

Figure 7:
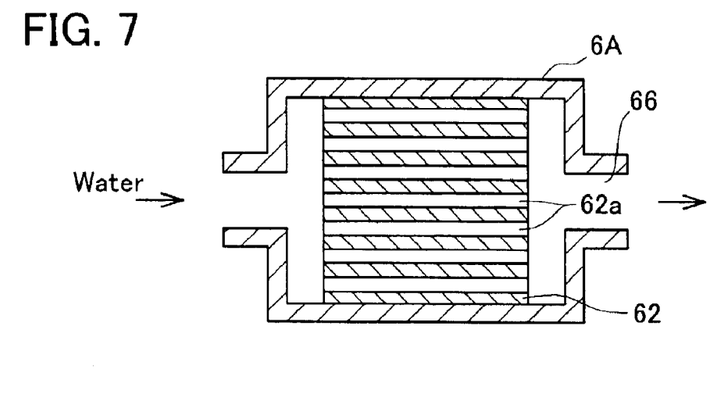
FIG. 7 is a different view showing the interior structure of the cartridge-type fluoride absorber.

For example, a cartridge 6A of a second embodiment, as shown in FIG. 7, is equally possible. The cartridge 6A has a multi-piped cylinder shaped (multi-tubed) fluoride absorbing member 62 provided within a portion of a discharge channel 66, that is, the fluoride absorbing member 62 is cylinder shaped and has a plurality of within-cylinder discharge channels 62a. From the viewpoint of increasing the physical strength etc. thereof, it is preferable that the shear cross-sectional face of the cylinder is honeycomb shaped. The cartridge case 6A provided with the fluoride absorbing member 62 formed in the above shape (and preferably made from hydroxyapatite) is also efficient in removing fluorine elements. In this type of cartridge 6A, the efficiency of fluoride absorption can easily be increased without increasing the size of the actual cartridge by increasing the number of within-cylinder discharge channels 62a and decreasing the diameter thereof.

Figure 8:
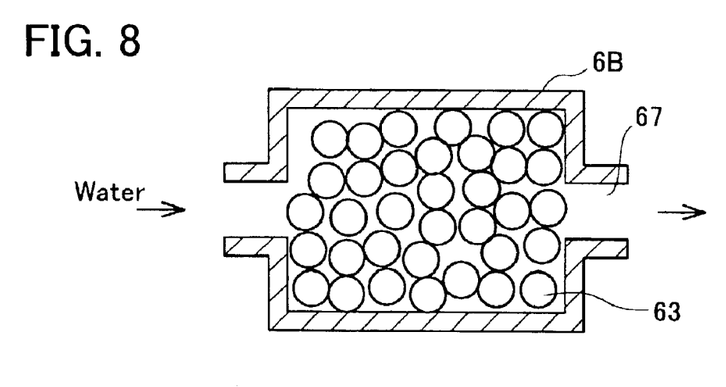
FIG. 8 is another view showing the interior structure of the cartridge-type fluoride absorber.

Further, a cartridge 6B of a third embodiment, as shown in FIG. 8, is equally possible. The cartridge 6B has a plurality of bead-shaped (here, 'bead' refers not only to simple spheres but also includes irregular-shaped particles and irregular shapes such as fragments of crushed ceramic) fluoride absorbing members 63 provided at a plurality of locations within a portion of a discharge channel 67. In this type of cartridge 6B, the efficiency of fluoride absorption can be modulated without increasing the size of the actual cartridge 6B by adjusting the ratio according to which the bead-shaped fluoride absorbing members 63 fill the discharge channel 67. For example, the filling ratio of the fluoride absorbing members can be increased relative to the unit volume of the discharge channel 67 by mixing two types of spherical fluoride absorbing members having differing diameters.

Figure 9:
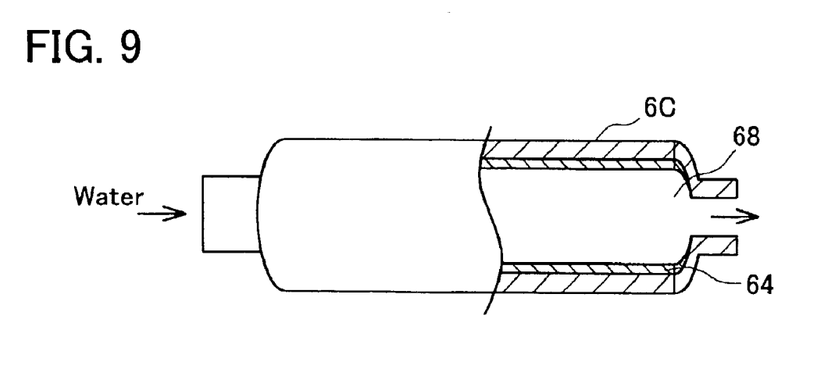
FIG. 9 is yet another view showing the interior structure of the cartridge-type fluoride absorber.

Furthermore, a cartridge 6C of a fourth embodiment, as shown in FIG. 9, is equally possible. The cartridge 6C has a membrane-shaped fluoride absorbing member 64 (preferably formed from porous hydroxyapatite) formed along an inner wall face thereof. This type of fluoride absorbing member 64 may, for example, be formed by applying a film-shaped hydroxyapatite porous body to the inner wall face or by flame coating the inner wall face with hydroxyapatite. In that case, it is preferred that the inner wall face of the piping (typically formed from stainless steel) that comprises the cartridge 6C is earlier coated with quartz glass, and the hydroxyapatite is coated over this quartz glass layer. In the cartridge 6C provided with this type of fluoride absorbing member 64, the flow-speed of water along a discharge channel 68 can be synchronized with other portions of the water circulation path.

Further, the membrane-shaped fluoride absorbing member 64 as shown in FIG. 9 may equally well be formed along the inner wall face of the entirety or a large portion of the piping that comprises the water circulation path 8. In that case, the portion of the piping having the fluoride absorbing member formed thereon corresponds to the fluoride absorber of the present invention.

The embodiments of the present invention described in detail above are merely intended to illustrate the invention and are not intended to limit the scope of the claims. The art set forth in the claims encompasses various transformations and modifications to the embodiments described above.

Further, the technical elements disclosed in the present specification or figures may be utilized separately or in all types of conjunctions and are not limited to the conjunctions set forth in the claims. Furthermore, the art disclosed in the present specification or figures may be utilized to simultaneously realize a plurality of aims or to realize one of these aims.

What is claimed is:

1. A fuel cell system comprising:
   a fuel cell main body;
   a water circulation path for circulating water through the fuel cell main body, and
   a fluoride absorber provided within the water circulation path, the fluoride absorber removing fluorine elements from the water circulating through the water circulation path.

2. A fuel cell system as set forth in claim 1, wherein;
   the fluoride absorber has a fluoride absorbing member contacting with the circulating water directly.

3. A fuel cell system as set forth in claim 2, wherein;
   the fluoride absorbing member is principally formed from hydroxyapatite.

4. A fuel cell system as set forth in claim 2, wherein;
   the fluoride absorbing member has one of the following shapes: a comb-shaped polyhedron shape, a multi-piped cylinder shape, or a bead shape.

5. A fuel cell system as set forth in claim 1, wherein;
   the fluoride absorber is of a cartridge type attached to the water circulation path such that the fluoride absorber can be removed and replaced.

6. A cartridge-type fluoride absorber used in a fuel cell system, the cartridge-type fluoride absorber comprising:

a fluoride absorbing member, and a cartridge case housing the fluoride absorbing member, the cartridge case having an inflow connection hole to be connected with an upstream side of a water circulation path of the fuel cell system, and an outflow connection hole to be connected with a downstream side of the water circulation path of the fuel cell system.

7. A fluoride absorber as set forth in claim 6, wherein;

the fluoride absorbing member is principally formed from hydroxyapatite.

8. A fluoride absorber as set forth in claim 6, wherein;

the fluoride absorbing member has one of the following shapes: a comb-shaped polyhedron shape, a multi-piped cylinder shape, or a bead shape.

* * * * *